United States Patent
Voigt

(10) Patent No.: US 10,783,881 B2
(45) Date of Patent: Sep. 22, 2020

(54) METHOD FOR PROCESSING A RECOGNITION RESULT OF AN AUTOMATIC ONLINE SPEECH RECOGNIZER FOR A MOBILE END DEVICE AS WELL AS COMMUNICATION EXCHANGE DEVICE

(71) Applicant: AUDI AG, Ingolstadt (DE)

(72) Inventor: Christoph Voigt, Großmehring (DE)

(73) Assignee: AUDI AG, Ingolstadt (DE)

( * ) Notice: Subject to any disclaimer, the term of this patent is extended or adjusted under 35 U.S.C. 154(b) by 194 days.

(21) Appl. No.: 16/040,632

(22) Filed: Jul. 20, 2018

(65) Prior Publication Data

US 2019/0051295 A1    Feb. 14, 2019

(30) Foreign Application Priority Data

Aug. 10, 2017 (DE) .......... 10 2017 213 946

(51) Int. Cl.
*G10L 15/197* (2013.01)
*G10L 15/18* (2013.01)
(Continued)

(52) U.S. Cl.
CPC ........ *G10L 15/197* (2013.01); *G10L 15/1815* (2013.01); *G10L 15/1822* (2013.01);
(Continued)

(58) Field of Classification Search
CPC ............. G10L 2015/223; G10L 15/197; G10L 15/1822; G10L 15/22
See application file for complete search history.

(56) References Cited

U.S. PATENT DOCUMENTS

| 6,078,886 A | 6/2000 | Dragosh et al. |
| 9,558,740 B1 * | 1/2017 | Mairesse ................. G10L 15/08 |

(Continued)

FOREIGN PATENT DOCUMENTS

| DE | 102010056174 A1 | 6/2012 |
| DE | 102015212650 A1 | 1/2017 |

OTHER PUBLICATIONS

Office Action dated Dec. 25, 2019 in corresponding Korean Application No. 10-2018-0092339; 5 pages including English-language translation.

(Continued)

*Primary Examiner* — Daniel C Washburn
*Assistant Examiner* — Oluwadamilola M Ogunbiyi
(74) *Attorney, Agent, or Firm* — Maier & Maier, PLLC

(57) ABSTRACT

A method for processing a recognition result of an automatic online speech recognizer for a mobile end device by a communication exchange device, wherein the recognition result for a phrase spoken by a user is received from the online speech recognizer as a text. A language model of permitted phrases is received from the mobile end device. A specification of meaning relating to a meaning of the phrase is assigned to each permitted phrase by the language model, and, through a decision-making logic of the communication exchange device, the text of the recognition result is compared with the permitted phrases defined by the language model and, for a matching permitted phrase in accordance with a predetermined matching criterion, the specification of meaning thereof is determined and the specification of meaning is provided to the mobile end device.

8 Claims, 1 Drawing Sheet

(51) Int. Cl.
*G10L 15/30* (2013.01)
*G10L 15/22* (2006.01)
*G10L 15/26* (2006.01)
*G06F 3/16* (2006.01)
*G10L 15/32* (2013.01)

(52) U.S. Cl.
CPC .............. *G10L 15/22* (2013.01); *G10L 15/30* (2013.01); *G06F 3/167* (2013.01); *G10L 15/26* (2013.01); *G10L 15/32* (2013.01); *G10L 2015/223* (2013.01)

(56) References Cited

U.S. PATENT DOCUMENTS

| | | | |
|---|---|---|---|
| 2004/0148170 A1* | 7/2004 | Acero | G06F 40/216 704/257 |
| 2006/0149544 A1* | 7/2006 | Hakkani-Tur | G10L 15/22 704/236 |
| 2009/0030696 A1* | 1/2009 | Cerra | G10L 15/30 704/275 |
| 2012/0215539 A1* | 8/2012 | Juneja | G10L 15/30 704/254 |
| 2013/0110510 A1* | 5/2013 | Klein | G10L 15/1815 704/235 |
| 2013/0289988 A1 | 10/2013 | Fry | |
| 2015/0019224 A1 | 1/2015 | Osawa et al. | |
| 2015/0142447 A1* | 5/2015 | Kennewick | G10L 15/285 704/275 |
| 2015/0371628 A1* | 12/2015 | Kreifeldt | G10L 15/02 704/254 |
| 2016/0071517 A1* | 3/2016 | Beaver | G06F 40/30 704/9 |
| 2016/0148612 A1* | 5/2016 | Guo | G10L 15/22 704/257 |
| 2017/0358305 A1* | 12/2017 | Kudurshian | G10L 15/22 |
| 2018/0061409 A1* | 3/2018 | Valentine | H04W 52/0267 |
| 2018/0068659 A1* | 3/2018 | Ikeno | G06F 40/242 |
| 2018/0101599 A1* | 4/2018 | Arnold | G06F 16/338 |
| 2018/0137857 A1* | 5/2018 | Zhou | G10L 15/063 |
| 2018/0275956 A1* | 9/2018 | Reed | H04R 25/554 |
| 2018/0277112 A1* | 9/2018 | Kim | G10L 15/22 |
| 2018/0330730 A1* | 11/2018 | Garg | G10L 15/1815 |
| 2019/0027134 A1* | 1/2019 | Kakirwar | G10L 15/063 |
| 2019/0027137 A1* | 1/2019 | Sohn | H04W 12/06 |
| 2019/0042560 A1* | 2/2019 | Kakirwar | G06F 40/30 |
| 2019/0042561 A1* | 2/2019 | Kakirwar | G06F 40/279 |
| 2019/0138270 A1* | 5/2019 | Dolph | G10L 15/265 |
| 2019/0206405 A1* | 7/2019 | Gillespie | G06F 40/30 |
| 2019/0214014 A1* | 7/2019 | Quillen | G10L 15/14 |
| 2019/0295531 A1* | 9/2019 | Rao | G10L 15/22 |
| 2020/0075008 A1* | 3/2020 | Kim | G10L 15/265 |
| 2020/0082823 A1* | 3/2020 | Mutagi | G06F 16/635 |

OTHER PUBLICATIONS

Examination Report dated Mar. 26, 2018 of corresponding German Application No. 102017213946.3; 10 pgs.

* cited by examiner

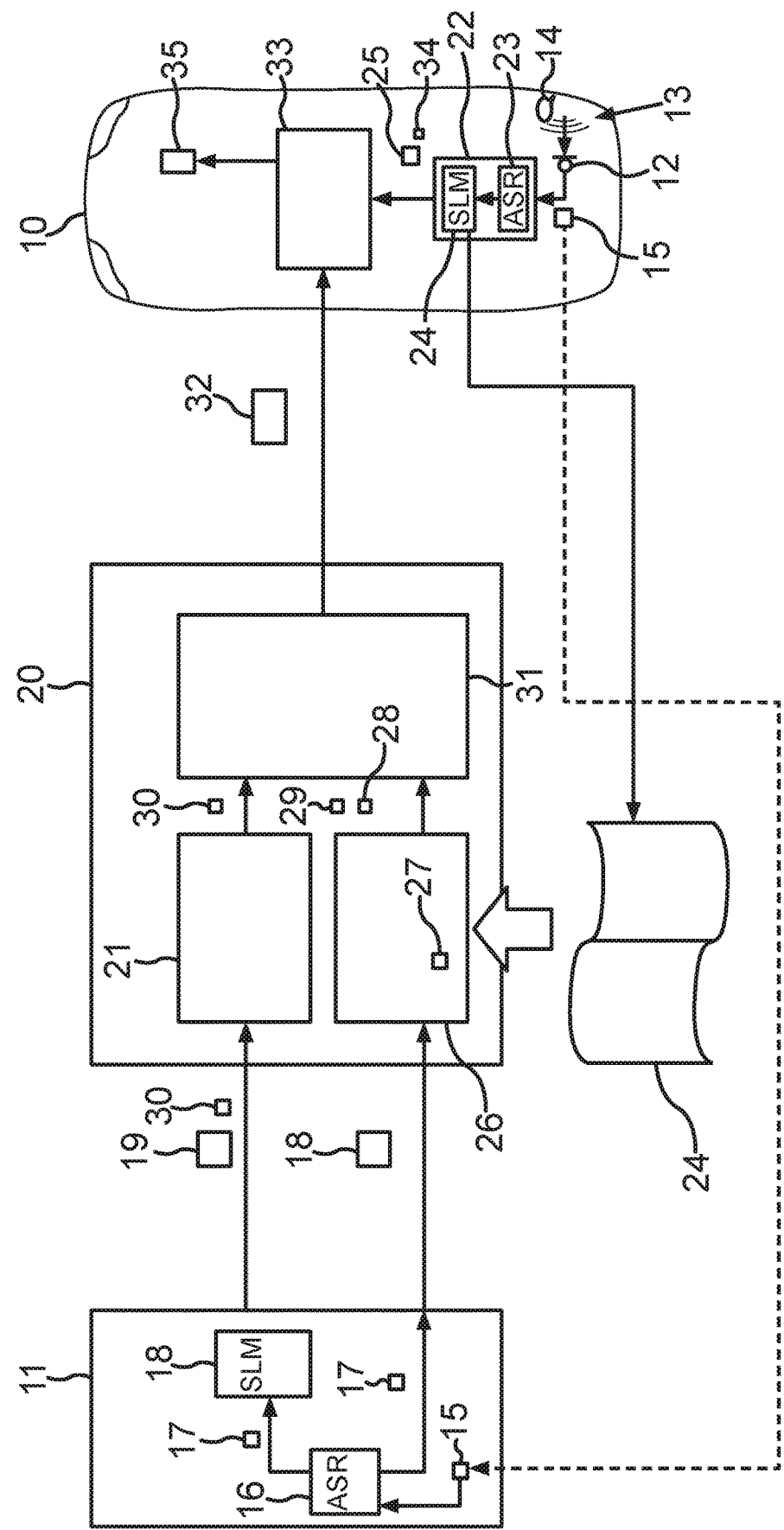

METHOD FOR PROCESSING A RECOGNITION RESULT OF AN AUTOMATIC ONLINE SPEECH RECOGNIZER FOR A MOBILE END DEVICE AS WELL AS COMMUNICATION EXCHANGE DEVICE

FIELD

The invention relates to a method for processing a recognition result that is provided by an automatic online speech recognizer for a mobile end device. The invention also includes a communication exchange device that carries out the processing.

BACKGROUND

For a mobile end device, such as, for example, a smartphone, but also a motor vehicle, it can be provided that a voice-operated control based on an automatic speech recognition (ASR) is made possible or is provided. An automatic speech recognizer used for this purpose can be provided external to the mobile end device by a server of the Internet or by an online service. Such an automatic speech recognizer, which is coupled to a mobile end device via an Internet connection, is referred to here as an online speech recognizer.

An example for such a coupling of a motor vehicle to an online speech recognizer is known from DE 10 2015 212 650 A1. It is additionally known from this publication that a so-called hybrid speech recognition can be provided, for which an additional speech recognizer, referred to here as an onboard speech recognizer, is provided in the motor vehicle itself.

An online speech recognition is also known from DE 10 2010 056 174 A1.

In general, an automatic speech recognizer can receive an audio voice signal that represents or signals a phrase spoken by a user. A phrase can be a single word or a sequence of words made up of several words. On the basis of the audio voice signal, the speech recognizer can produce a text that presents the language content of the phrase and, namely, does so in the way in which the speech recognizer has recognized the content. This text represents the recognition result of the speech recognizer. A possibility of checking the recognition result for correctness is provided by using a so-called language model, which describes all permitted sequences of words or phrases that the user must use in general only for the operation of the speech recognizer. The language model thus specifies the permitted or valid phrases. The language model can be formed, for example, on the basis of a mathematical graph, in which each permitted word is represented as a node and permitted sequences of words are defined by linking the nodes. Each valid path through this graph then represents a permitted phrase.

The language model can be altered, however, in a mobile end device depending on the current control context. for example, one language model can be provided for the control of media playback (for example, playing of MP3 files) and another language model can be provided for the control of, for example, a communication program, such as, for example, an e-mail program. It is therefore difficult for an online speech recognizer to provide an appropriate language model for a mobile end device, because the control context thereof can change.

Known from US 2015/0019224 A1 is a speech recognizer with downstream word processing, through which word abbreviations or short cuts in the recognition result can be processed separately.

SUMMARY

The invention is based on the object of providing an error-robust online speech recognition for a mobile end device.

The invention provides a method by means of which a post-processing of a recognition result of an automatic online speech recognizer is made possible. The method serves for processing a recognition result of an automatic online speech recognizer for a mobile end device. The method can be carried out by a communication exchange device, which can be connected between the online speech recognizer and the mobile end device. However, the communication exchange device can also be integrated into the online speech recognizer or into the mobile end device, or it can be integrated into both of them, in part in each case as a distributed device.

The recognition result that is to be processed belongs to a phrase spoken by a user. It is received by the communication exchange device as a text from the online speech recognizer. In the way mentioned in the introduction, the interest is then to check this raw, unchecked text as to whether it represents a permitted phrase that is allowed in the mobile end device in the current control context, for example, that is, whether it can be processed or used. For this purpose, a language model of the permitted phrase is received from the mobile end device. In this case, the language model has, in addition, the special feature that the language model assigns to each permitted phrase also a specification of meaning relating to a meaning of the phrase. By the specification of meaning, therefore, the semantics or meaning content of the phrase is defined or specified. The specification of meaning thus specifies the intention that the user had when speaking the phrase. For example, the phrase "I am hot!" can be assigned the specification of meaning that what is involved is the control of an air-conditioning system and that the cooling power of the air-conditioning system is to be increased. The same specification of meaning can also be assigned, for example, to the phrase "Please provide some fresh air." For such a specification of meaning, a specific control command can then be provided. Accordingly, the user can therefore formulate a phrase in very colloquial or natural language, and, in this way, it is nonetheless possible by means of the language model to interpret or trigger a control command for a component of the mobile end device.

In the communication exchange device, therefore, both the text of the recognition result and the currently valid language model for the mobile end device valid are present. Through a decision-making logic of the communication exchange device, the recognition result is compared with the permitted phrases defined by the language model. For a permitted phrase that the text matches in accordance with a predetermined matching criterion, the specification of the meaning thereof is then determined and the specification of the meaning is provided to the mobile end device. The mobile end device thus receives a recognition result that has already been processed to the extent that the meaning of the phrase spoken by the user is communicated and not just the raw text that reproduces the phrase literally. From the specification of meaning, it is possible with little technical effort and/or computational effort to produce a control signal or control command for a component of the mobile end device.

The invention affords the advantage that the mobile end device has available to it not only a text of a recognition result, which would need to be checked for plausibility or verified once again by the mobile end device, and then, in addition, would still need to be interpreted in terms of its meaning. Instead of this, the mobile end device has available to it already a specification of meaning relating to the spoken phrase. This reduces the processing that is needed in the mobile end device for processing a spoken phrase.

The communication exchange device can be provided as an independent computer or independent computer network, which, for example, can be coupled via a respective communication connection to the online speech recognizer, on the one hand, and to the mobile end device, on the other hand. The decision-making logic can be provided in the communication exchange device as, for example, a program module. As an integral component of the online speech recognizer and/or of the mobile end device, however, the communication exchange device itself can also be provided overall as a program module.

The invention includes enhancements, by way which additional advantages ensue.

The described comparison of the text of the recognition result can occur by means of a 1-to-1 comparison. The basis thereof can be an algorithm for a string comparison, as is known from the prior art (so-called string matching algorithm). Such a string comparison is iterative, so that, in the case of a plurality of permitted phrases with an identical beginning (for example, "Can you X . . . " and "Can you Y . . . "), this beginning needs to be compared with the text of the recognition result only one time and, subsequently, only the respective remaining part of each permitted phrase (in the example "X . . . " and "Y . . . ") needs to be checked separately. This results in the advantage that the comparison can be carried out with little computational effort.

In this case, said matching criterion can require a 100 percent match. However, it can also come about that the language model is not complete in that the user uses a phrase than is not identical to one of the permitted phrases. Nonetheless, in order to be able to also use a phrase of the user that is not a 100 percent matching phrase—for example, as a voice command for a control of the mobile end device—it can be provided that, in the comparison of the recognition result with the permitted phrases of the language model, a confidence value, which describes or specifies a degree of matching between the text and the respective permitted phrase, is determined in each case. Such a degree of matching can also be computed or specified by using the described string matching algorithm. The confidence value thereby affords the advantage that, as a matching criterion, it is also possible to specify a threshold value that does not demand a 100 percent match. For example, the matching criterion can require a match of more than 70% or more than 80% or more than 90%. Accordingly, a voice command of the user can also be recognized when there is a deviation from the language model.

A language model does not need to be provided exclusively by the mobile end device. It can be provided that the online speech recognizer also uses an autonomous online language model, which, however, is not necessarily adapted to the current control context of the mobile end device. It is thus possible to receive from the online speech recognizer, in addition to the actual text of the recognition result, also an online specification of meaning determined by the online speech recognizer, that is, a second specification of meaning. In this case, the fact is used that, in addition to the online specification of meaning, also an online confidence value can be received in the described way. The online confidence value therefore specifies the match of the text of the recognition result with the online language model of the online speech recognizer. In the communication exchange device, two specifications of meaning are then present, namely, the specification of meaning of the communication exchange device itself and also the online specification of meaning from the online speech recognizer. However, for each specification of meaning, there is also a confidence value. The specification of meaning that is determined by the communication exchange device itself is provided only conditionally to the mobile end device, namely, at least in the case that it is determined by an assignment logic or arbiter logic of the communication exchange device that the confidence value of the specification of meaning of the language model of the communication exchange device is greater than the online confidence value of the online specification of meaning of the online speech recognizer. In other words, in this case, the text of the recognition result has a greater match with the language model of the mobile end device than it does with the online language model of the online speech recognizer. If, conversely, the online confidence value is greater, it can be provided that either only the online specification of meaning is provided or else both specifications of meaning are provided. This enhancement affords the advantage that two different language models are applied to the recognition result and, in this way, it is also possible to identify phrases that are not modeled by the language model of the mobile end device. The arbiter logic can be provided as a program module in the communication exchange device.

The language model is preferably a statistical language model. Such a statistical language model has the advantage that, for each valid phrase, also a probability of occurrence, which specifies the relative frequency of the respective phrase in relation to all phrases, is specified. The frequency of each phrase can be determined, for example, through questioning test persons by asking them to specify for a predetermined specification of meaning (for example, "increase the air-conditioning system cooling power") a phrase that would express this meaning (for example, "I am hot!" or "Please provide some cool air!"). The sum total of all of these phrases spoken by test persons in regard to at least one specification of meaning then represents the permitted phrases that are described by the language model. The relative frequency of each phrase in the comparison of the text of the recognition result with the permitted phrases can be used for the purpose of resolving an equivocal comparison result in that the comparison result with the higher relative frequency of the associated phrase is used. In this way, it is possible in an advantageous way, to check the comparison result for plausibility. The online language model can also be a statistical language model.

Preferably, the language model involves a model that describes all valid forms of voice commands that can be spoken and are currently provided for a voice-operated control as permitted phrases in the mobile end device. Accordingly, it is possible by means of an online speech recognizer to provide a voice-operated control in the mobile end device. The number of voice commands that can be used for this is thereby greater than the number of control commands that can be triggered, because, by means of the language model, a plurality of phrases (that is, voice commands) can be assigned to the same specification of meaning (control command).

As already discussed, the mobile end device can be, for example, a smartphone or a tablet PC or a smartwatch. However, a mobile end device can also be, for example, a motor vehicle. Accordingly, the mobile end device then represents a motor vehicle that has a voice-operated control device. The voice-operated control can be provided, for example, by means of an infotainment system (information entertainment system). The advantage thereby ensues that it is not necessary to operate complicated speech recognition software in the motor vehicle.

If, in the motor vehicle or, in general, in the mobile end device, an automatic onboard speech recognizer is nonetheless present, then it can be integrated or used also by means of an enhancement of the method according to the invention. Therefore, in the mobile end device, an onboard recognition result is determined additionally by the automatic onboard speech recognizer. In this case, the onboard speech recognizer uses, in comparison to the online speech recognizer, another recognition algorithm and/or another vocabulary and/or another recognition grammar. In this way, the advantage ensues that, on account of these different kinds of implementation, an onboard false recognition and an online false recognition that are identical can practically never occur at the same time, that is, for the same phrase. It is therefore ensured that the recognition result of the online speech recognizer or of the onboard recognition result is correct or at least distinguishes false recognitions, so that, to be certain, the user can then be queried as to what was meant.

One possibility for determining the correct recognition result from two recognition results provides for determining, in the mobile end device, an onboard specification of meaning from the onboard recognition result by means of the language model (which is indeed already provided by the communication exchange device) and for selecting by means of an onboard arbiter logic (that is, another arbiter logic) between the onboard specification of meaning and the specification of meaning from the communication exchange device. On the basis of a respective confidence value of the specification of meaning, the arbiter logic can again select, from the communication exchange device and the onboard specification of meaning, that specification of meaning with the greater confidence value. This presupposes, of course, that the communication exchange device has also actually provided its specification of meaning and has retained it, because the online specification of meaning of the online speech recognizer has been instead selected. In the latter case, of course, a selection is made by the onboard arbiter logic between the online specification of meaning and the onboard specification of meaning in the described way.

In order to carry out the method according to the invention, a communication exchange device that can couple an online speech recognizer and a mobile end device in the described way is provided. The communication exchange device has a processor device, which is set up for the purpose of carrying out an embodiment of the method according to the invention. The communication exchange device can be designed, for example, as a router for transmitting data traffic between the online speech recognizer and the mobile end device. Via the communication exchange device, it is also possible to communicate or route or transmit a voice signal of the user to the online speech recognizer. The processor device of the communication exchange device may have at least one microcontroller and/or at least one microprocessor. The processor device can have a program code, which is written for the purpose of carrying out said embodiment of the method according to the invention. The communication exchange device can be realized, for example, as a computer or a computer network, which can be connected to the Internet.

BRIEF DESCRIPTION OF THE DRAWING

Exemplary embodiments of the invention are described below. For this purpose, FIG. 1 shows a schematic illustration of an embodiment of the communication exchange device according to the invention.

DETAILED DESCRIPTION

The exemplary embodiments explained below are preferred embodiments of the invention. In the exemplary embodiments, the described components of the embodiments each represent individual features of the invention, which are to be regarded as being independent of one another and each of which enhances the invention independently of one another, and hence are also to be regarded as being a part of the invention, individually or in a combination that is different from the combination that is shown. Furthermore, the described embodiments can also be supplemented by features that are additional to those already described.

FIG. 1 shows a motor vehicle 10, which can be, for example, an automobile, in particular a passenger car or a truck. The motor vehicle 10 represents a mobile end device. Further represented is an online speech recognizer 11, which, for example, can be provided as an online service or as a server of the Internet. In the motor vehicle 10, it is possible by means of a microphone device 12 to record a speech sound 13 when the user utters a phrase 14, such as, for example, an order or a voice command for a control of the motor vehicle 10. A voice signal 15, recorded by means the microphone device 12, can be provided in digitized form to the online speech recognizer 11 via a communication connection. The communication connection can be created, for example, on the basis of an Internet connection and/or a radiofrequency connection. The radiofrequency connection can be realized, for example, as a mobile radiofrequency connection or a WLAN connection (WLAN—wireless local area network).

The online speech recognizer 11 can produce a recognition result from the voice signal 15 by means of an automatic speech recognition 16 (ASR), which can be output as a text 18. It is additionally possible for the online speech recognizer 11 to produce an online specification of meaning 19 from the recognition result 17 by means of an online language model 18, said online specification of meaning specifying for the recognition result 17 the meaning of the recognition result in regard to the control of the motor vehicle and/or of an Internet browser and/or of an online service. The online language model 18 presents an assignment rule for assigning a specification of meaning 19 to a possible recognition result 17. This can be done, for example, in the form of a table or by means of a list. If the recognition result 17 reads, for example, "I have to speak with XY!", then, by means of the online language model 18 as an online specification of meaning 19, it can be determined that a telephone control is desired and the telephone number of the person XY is to be dialed. The online language model 18 can be, for example, a statistical language model (SLM).

The text 18 of the recognition result 17 and the associated online specification of meaning 19 can be transmitted to a communication exchange device 20, which, for example, can be provided by another server on the Internet or by an online service. The communication exchange device 20 can represent a router, which is intended to forward the text 18 and the online specification of meaning 19 to the motor vehicle 10. In the communication exchange device 20, it is possible to provide a wrapper device or adapter device 21, which can convert a format of the online specification of meaning 19 to a predetermined format for the motor vehicle 10.

For example, in the motor vehicle 10, it is possible to provide an onboard speech recognizer 22, which, likewise by means of an automatic speech recognition unit 23, can produce a recognition result from the voice signal 15, from which, by use of an onboard language model 24, an onboard specification of meaning 25 can be produced in a comparable way by means of the online language model 18. The adapter device 21 can adjust, for example, a format of the online specification of meaning 19 to a format of the onboard specification of meaning 25.

However, the onboard language model 24 can also be applied to the text 18 of the recognition result 17 of the online speech recognizer 11 by means of the communication exchange device 20. For this purpose, the onboard language model 24 can be transferred to the communication exchange device 20. For example, what is involved, in each case, can be the onboard language model 24 that describes a current control context. In other words, the onboard language model 24 may be replaceable in the case of the onboard speech recognizer 22.

The communication exchange device 20 can have a decision-making logic 26, by means of which the permitted phrases defined by the onboard language model 24 can be compared with the text 18. In each case, a permitted phrase can correspond to a control command or control signal for a component of the motor vehicle 10 or trigger such a control command.

On the basis of a matching criterion 27, it is possible to determine the text 18 that matches the permitted phrases defined by the onboard language model 24. Through the matching criterion 27, it is possible to specify here a 100 percent match or else a match of a lesser degree of matching than 100%. It is additionally possible to provide for a selection of the permitted phrases that have the highest degree of matching or else the N best matches can be used, where N is an integer greater than 0. For simpler illustration, N=1 will be assumed below.

The phrase of the language model 24 for which the text 18 meets the matching criterion 27 can be output or fixed as a specification of meaning 28. The degree of the match can be expressed as a confidence value 29, such as, for example, as a percent value. It is equally possible to provide an online confidence value 30 for the online specification of meaning 19 as a percent value, for example.

The communication exchange device 20 can have an arbiter logic 31, by which the confidence values 29, 30 can be compared. The arbiter logic 31 can relay at least the specification of meaning 19, 28 that has the greater confidence value 29, 30 to the motor vehicle 10 as a final recognition result 32.

Accordingly, as a final recognition result 32, the specification of meaning 19, 28 that was selected by the arbiter logic 31 is relayed.

In the motor vehicle 10, it is possible to provide an onboard arbiter logic 33, which receives the final recognition result 32 with the associated confidence value 29, 30. Furthermore, the onboard arbiter logic 33 can likewise receive from the onboard speech recognizer 22 the specification of meaning 25 determined by it as well as an associated confidence value 34. The onboard arbiter logic 33 can then comparatively evaluate the online recognition result 32 and the onboard recognition result 25 on the basis of the associated confidence values and thereby select a specification of meaning 35 to be used in the motor vehicle 10 as a recognition result. On the basis of this specification of meaning 35, it is then possible, for example, to produce a control command or a control signal for a component of the motor vehicle.

Overall, a hybrid speech recognition for commands or, in general, phrases 14, always in parallel to processing in the motor vehicle 10, can therefore also be sent to the online recognizer 11. The online recognizer 11 determines, besides the function or meaning, also the complete spoken phrase (online word recognition) and returns said complete spoken phrase in text form as a text 18. This result does not remain unused.

The raw data of the statistical model 24 used in the motor vehicle is deposited in the communication exchange device 20 (voice router) between the vehicle 10 and the online recognizer 11 and is processed such that a one-to-one real-time assignment between the text 18 of the spoken phrase 14 and the raw data of the statistical model 24 is possible.

This takes place by using the text 18 of the online word recognition in the communication exchange device 20 (voice router). In a decision-making logic 26, the text 18 of the online word recognition is compared with the SLM data collection used by the onboard process. Here, a 1-to-1 comparison of the recognized text phase 18 with the collected data of the language model 24, that is, with the permitted phrases, takes place.

Because two results are now obtained in the form of the specifications of meaning 19, 28, that is, the online topic (online specification of meaning 19) as well as the new word-recognition result (specification of meaning 28), they must be compared with each other and a decision must be made as to which result is used further in regard to the motor vehicle 10. This decision is made in a corresponding arbiter 31.

A language model 24 for the operation of an air-conditioning system by speech, for example, includes hundreds of possible ways that, for example, the temperature can be adjusted. In the voice router, the decision-making logic 26 now collates the text 18 of the spoken phrase 14 with the raw data of the language model 24.

If, for example, the spoken text "I am cold" occurs in the raw data of the language model 24, then, on the basis of the very selective word recognition in the online recognizer 11, it can be assumed that the user has actually said this.

Accordingly, it is possible, for example, either to confirm the recognized result 17 of the online recognizer 11 or even prevent a "Pardon me?" in the case of borderline recognitions (lifting of the confidence), or, however, if necessary, it is possible to prevent a false recognition in the motor vehicle 10. Because, as a rule, on account of different kinds of implementation, an onboard and an online false recognition practically never occur at the same time, the recognition rate of the described hybrid speech recognition system can be increased far above 95% by use of the described implementation.

Overall, the examples show how, by the invention, a recognition of onboard voice commands in a motor vehicle 10 can be optimized through the use of online speech recognition.

The invention claimed is:

1. A method for processing a recognition result of an automatic online speech recognizer for a mobile end device by a communication exchange device, wherein the recognition result for a phrase spoken by a user is received from the online speech recognizer as a text, comprising:

receiving a language model of permitted phrases from the mobile end device, wherein a specification of meaning relating to a meaning of the phrase is assigned to each permitted phrase by the language model, and, through a decision-making logic of the communication exchange device, the text of the recognition result is compared with the permitted phrases defined by the language model, and, for a matching permitted phrase in accordance with a predetermined matching criterion, the specification of meaning thereof is determined, and the specification of meaning is provided to the mobile end device wherein, in the comparison of the text of the recognition result with the permitted phrases, a confidence value describing the degree of matching is determined, and from the online speech recognizer, in addition, an online specification of meaning, determined by the online speech recognizer, is received together with an online confidence value, and the specification of meaning from the language model is provided to the mobile end device at least in the case when it is recognized by an arbiter logic of the communication exchange device that the confidence value of the specification of meaning of the language model is greater than the online confidence value of the online specification of meaning of the online speech recognizer.

2. The method according to claim 1, wherein the comparison of the text of the recognition result with the permitted phrases is made by a 1-to-1 comparison.

3. The method according to claim 1, wherein the language model is a statistical language model.

4. The method according to claim 1, wherein the language model describes all valid forms of voice commands that can be spoken and that are provided in the mobile end device as the permitted phrases for a voice-operated control.

5. The method according to claim 1, wherein the specification of meaning is provided to a motor vehicle as a mobile end device.

6. The method according to claim 1, wherein, in the mobile end device, in addition, an onboard recognition result is determined by an automatic onboard speech recognizer, wherein the onboard speech recognizer, when compared to the online speech recognizer, uses a different recognition algorithm and/or another vocabulary and/or another recognition grammar.

7. The method according to claim 6, wherein, in the mobile end device, an onboard specification of meaning is determined from the onboard recognition result by the language model, and a selection is made by an onboard arbiter logic between the onboard specification of meaning and the specification of meaning from the communication exchange device in the case that the specification of meaning is provided by the communication exchange device.

8. A communication device with a processor device, which is set up for the purpose of carrying out a method according to claim 1.

* * * * *